United States Patent [19]

Cahuzac et al.

[11] Patent Number: 4,917,756

[45] Date of Patent: Apr. 17, 1990

[54] MACHINE FOR MANUFACTURING COMPOSITE REINFORCEMENT ELEMENTS WOVEN IN THREE DIMENSIONS

[75] Inventors: Georges J. J. Cahuzac, Saint Jean D'Illac; François Monget, Merignac, both of France

[73] Assignee: Aerospatiale Societe Nationale Industrielle, Paris, France

[21] Appl. No.: 173,754

[22] Filed: Mar. 23, 1987

[51] Int. Cl.[4] .................. B65H 81/00; D05B 93/00
[52] U.S. Cl. ............................. 156/429; 156/93; 156/148; 156/173; 156/169; 156/425; 156/446; 242/7.21; 112/412; 112/415; 112/121.11; 112/121.12
[58] Field of Search ............... 156/173, 169, 175, 180, 156/93, 148, 425, 429, 428, 446, 361, 522, 526, 574; 428/102, 113; 242/7.01, 7.02, 7.21; 112/415, 412, 121.11, 121.12, 121.15

[56] References Cited

U.S. PATENT DOCUMENTS

| | | | |
|---|---|---|---|
| 3,437,813 | 4/1969 | Eisengrein et al. | 112/121.12 X |
| 3,497,780 | 2/1970 | Leenhouts | 112/121.12 X |
| 3,775,219 | 11/1973 | Karlson et al. | 156/526 X |
| 3,810,805 | 5/1974 | Goldsworthy et al. | 156/361 |
| 4,059,468 | 11/1977 | Bouillon | 428/102 X |
| 4,063,684 | 12/1977 | O'Brien et al. | 428/102 X |
| 4,080,915 | 3/1978 | Bompard et al. | 242/7.21 X |
| 4,495,231 | 1/1985 | Laskaris et al. | 156/169 X |
| 4,503,788 | 3/1985 | Giannuzzi et al. | 112/121.12 |
| 4,699,683 | 10/1987 | McCowin | 156/522 X |
| 4,746,393 | 5/1988 | Ephere et al. | 156/173 X |
| 4,934,203 | 7/1983 | Bompard et al. | 156/175. |

*Primary Examiner*—Michael W. Ball
*Assistant Examiner*—Jeff H. Aftergut
*Attorney, Agent, or Firm*—McGlew & Tuttle

[57] ABSTRACT

The machine comprises a frame (1, 2, 3, 4), a rotary mandrel (15) mounted on a horizontal shaft (14), a vertical arm (12) having a detachable work device (20) at the lower end of the arm, and means (M1, M2, M3) for shifting the arm (12) along three orthogonal axes (X, Y, Z).

5 Claims, 7 Drawing Sheets

MACHINE FOR MANUFACTURING COMPOSITE REINFORCEMENT ELEMENTS WOVEN IN THREE DIMENSIONS

FIELD AND BACKGROUND OF THE INVENTION

The present invention relates to the manufacture of composite reinforcement elements woven or knitted in three dimensions from textile, mineral, synthetic or other fibers impregnated with a resin which is subsequently polymerized or otherwise hardened.

Reinforcement elements of this type are principally, but not exclusively, employed in the aeronautic and space fields in which they have many applications, in particular for producing parts which must withstand thermo-mechanical stresses, as the thermal protections of bodies which re-enter the atmosphere, the powder rocket nozzles, aircraft brakes, or parts which must withstand high mechanical stresses such as hubs of helicopter rotors, undercarriages and inserts of wings, leading edges, etc.

Many processes and apparatus have been imagined and developed for producing such reinforcement elements, but the automatized manufacture of parts of complex shape encounters great difficulties which result in very complicated and consequently costly machines without the parts obtained always possessing all the required qualities of homogeneity and resistance.

Furthermore, the remarkable properties of these composite elements lead to the use thereof for constructing parts having complicated, evolutive shapes that present machines are incapable of manufacturing.

Machines are known for producing composite reinforcement elements which are of revolution, hollow and woven in two dimensions horizontally around rigid perpendicular rods mounted in concentric ring arrangements on a rotatable support, which are subsequently replaced by threads, as described for example in U.S. Pat. No. 4,183,232 and U.S. Pat No. 4,346,741 in the name of the applicant.

According to another method, a hollow support mandrel is used on the surface of which a plurality of parallel layers of threads is deposited in two crossed directions and lines of stitching perpendicular to these layers are formed, as described in particular in FR-A- No. 2,355,936.

According to FR-A- No. 2,315,562, the hollow support mandrel is of metal and capable of being taken apart and formed by spaced sectors comprising apertures in which points are driven, around which points are stretched out threads forming the various crossed superimposed layers which are thereafter sewn by rows of stitches formed in the gaps between the sectors of the mandrel.

All the processes and apparatus described in these documents require a hollow mandrel since the connection of the superimposed layers by stitches necessarily requires introduction of a device in the mandrel for knotting the thread introduced from the exterior.

Moreover, the stitches are effected with needles having a flap valve or a closed eye which is delicate to use for fragile fibers which sometimes require a lapping of the thread.

Another process and device described in FR-A- No. 2,408,676 employ on the other hand a solid mandrel composed of foam material in which sections of rigid threads, termed "picots", are implanted and around which the layers of threads are laid in two different directions and which constitute the threads of the third direction.

This process has various drawbacks. First of all, the "picots" must be previously subjected to a pre-rigidifying treatment, which increases their diameter, to permit their implantation.

Secondly, the "picots" which must become an integral part of the part to be produced must consequently be provided in a considerable number, on the order of several tens of thousands, implanted very close to one another, which is practically impossible with a machine.

Furthermore, in the case of a part having a complex shape whose surface forms corners or curves, the implantation of the neighboring "picots" which are excessively close together is very difficult to achieve without interference therebetween, and the very narrow passages they define do not permit an easy laying of the threads in even layers, which laying is found to be even impossible in the regions where the threads change orientation.

Lastly, the "picots" excessively close to one another behave imperfectly, in particular in the curved parts, and this results in defective homogeneity in the finished part.

SUMMARY AND OBJECTS OF THE INVENTION

An object of the invention is to overcome these drawbacks and those of the other processes and devices of the prior art, by providing a novel machine whereby it is possible to produce reinforcement elements which not only have the shape of a solid of revolution but also an evolutive profile (large variations in diameter and curvature) and shapes having flat surfaces or even flat shapes or blocks.

The invention provides a machine for carrying out a process for manufacturing composite reinforcement elements woven in three dimensions from textile, mineral, synthetic or other fibers, which have complex shapes, a high resistance to thermal, mechanical or thermo-mechanical stresses, and intended more particularly for applications in the aeronautic or space field, the process being of the type comprising employing a disposable mandrel composed of a foam or like material having externally the internal shape of the reinforcement element to be produced, implanting rigid members in the mandrel and applying on the surface of the mandrel successive layers of threads or fibers, which layers are superimposed and crossed in at least two directions, interconnecting said layers by means of threads or fibers which extend perpendicularly therethrough, impregnating the assembly with a hardenable binder, and withdrawing the mandrel, said rigid members being pins temporarily implanted in the mandrel for retaining a continuous thread of fibers on said pins and in contact with the surface of the mandrel, stretching out a continuous thread on said pins so as to form in succession at least three superimposed and crossed even layers, introducing through said layers from the exterior a continuous thread forming successive open loops by means of a needle through which said thread passes, and withdrawing said pins.

In a reinforcement element produced in this way, said layers are maintained assembled by conjugate gripping and friction actions of the threads of said layers on said thread loops.

The machine according to the invention is of the type comprising a frame, a horizontal rotatable mandrel-carrying shaft, a detachable mandrel composed of a perforatable material mounted on said shaft, and means for driving said shaft in rotation, wherein the frame carries a vertical arm which is located above said shaft and adjustable along three orthogonal axes and includes at its lower end fixing means for detachable work devices and means for orienting said device about a horizontal axis.

According to another feature of the invention, a set of three different detachable work devices is provided which are adaptable on said lower end of the arm, namely a device for driving the pins into the mandrel, a device for laying thread and a needle device for driving in a continuous thread forming consecutive loops through the crossed layers of thread laid on the mandrel.

Another object of the invention is to provide a product produced by the process and machine defined hereinbefore, said product comprising at least three crossed and superimposed even layers of threads of fibers maintained assembled by a gripping and friction action on the consecutive loops of a continuous thread introduced from the exterior through said layers by means of a hollow needle.

The following description with reference to the accompanying drawings given by way of non-limitative examples will explain how the invention can be carried out.

DESCRIPTION OF THE PREFERRED EMBODIMENTS

Figure 1:
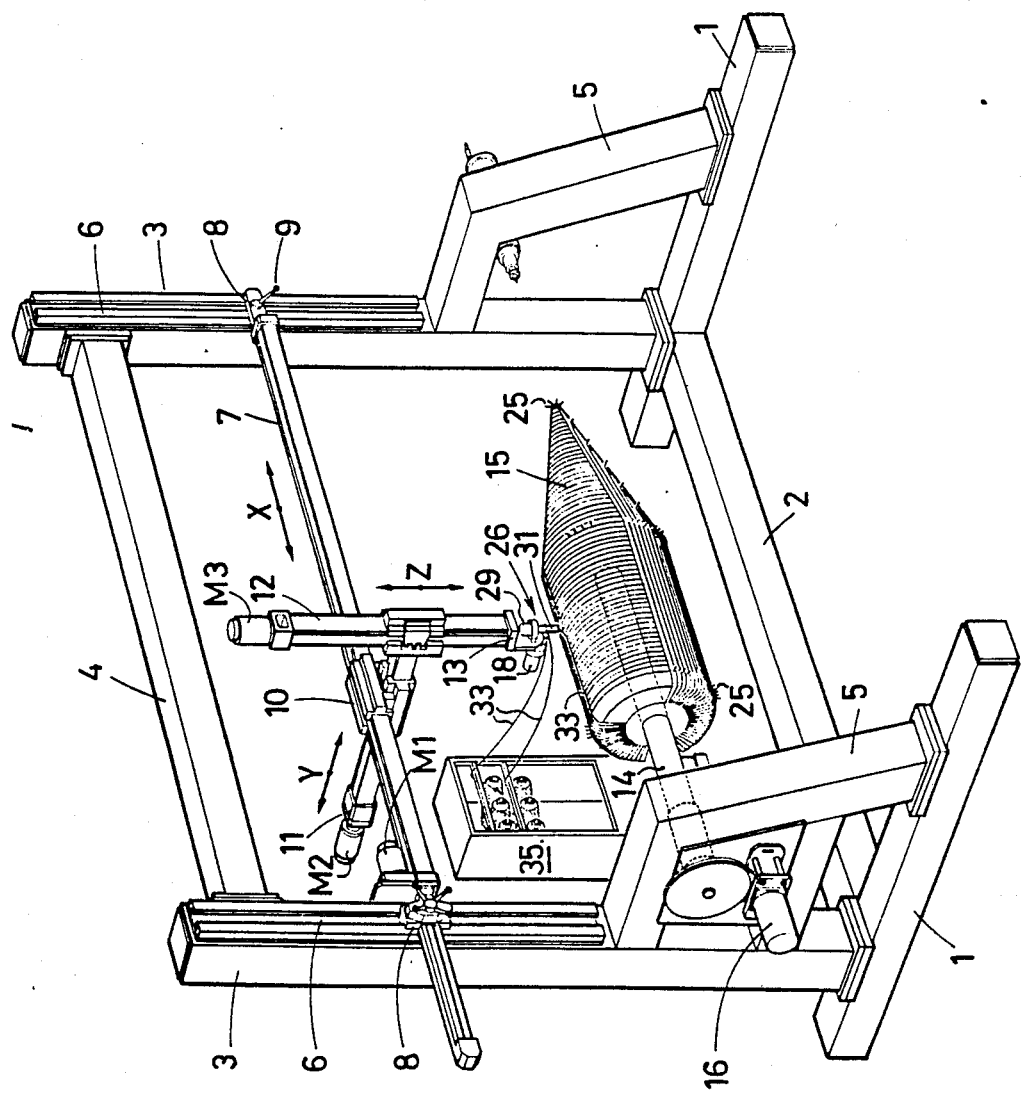
FIG. 1 is a perspective view of an embodiment of the machine according to the invention.

With reference to FIG. 1, the machine according to the invention comprises a frame having two feet 1, a lower cross-member 2, two vertical posts 3 interconnected in their upper part by a second cross-member 4 and two lateral supports 5.

Each vertical post 3 comprises a slideway 6, and a transverse bar 7 is fixed in the vicinity of its ends in slides 8 slidably mounted in the slideway 6, in which latter they can be immobilized by screws 9. With this arrangement, the bar 7 can be adjusted in height on the posts 3.

Mounted on the bar 7 is a carriage 10 on which is mounted a horizontal arm 11 transversely slidable in an adjustable manner relative to the bar 7.

The horizontal arm 11 carries at one of its ends a vertical arm 12 also slidably mounted in an adjustable manner.

The vertical arm 12 includes at its lower end 13 fixing means adapted to receive a detachable work device which is more clearly shown in FIGS. 4 to 7.

The machine further comprises a horizontal shaft 14 rotatably mounted in one of the lateral supports 5 and adapted to carry a mandrel 15, this shaft extending in a direction parallel to the bar 7 and below the latter.

The shaft 14 is driven in rotation by a step-by-step electric motor 16 which is also mounted on the lateral support 5.

It will be understood that, owing to the arrangement of the bar 7 and the arms 11 and 12, the end 13 may be adjusted in any desired position with respect to the mandrel 15 along three orthogonal axes X, Y and Z by means of motors M1, M2 and M3 which are shown by way of example to be mounted on the bar 7 and at the ends of the arms 11 and 12 and to drive the latter along said three axes through suitable known systems such as a rack and pinion system, lead-screw system or other system.

Figure 5:
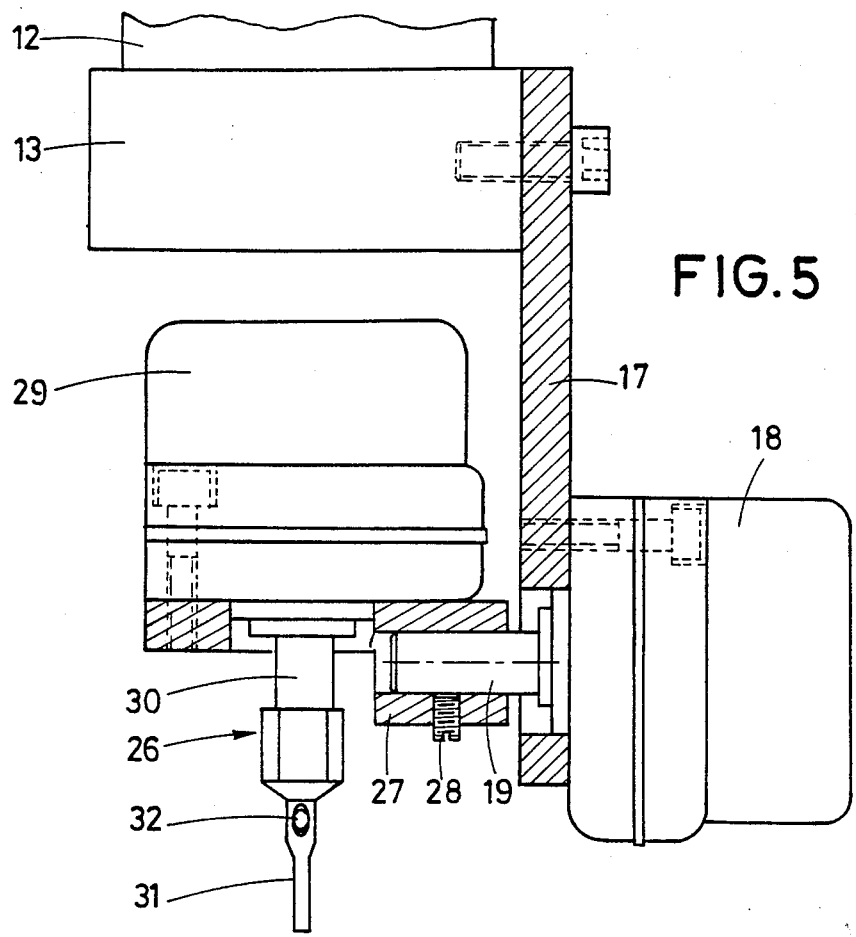
FIGS. 5 and 6 are views to an enlarged scale of another detachable work device adapted to lay the thread on the mandrel, mounted at the lower end of the vertical arm, and means for orienting the thread laying device.
Figure 6:
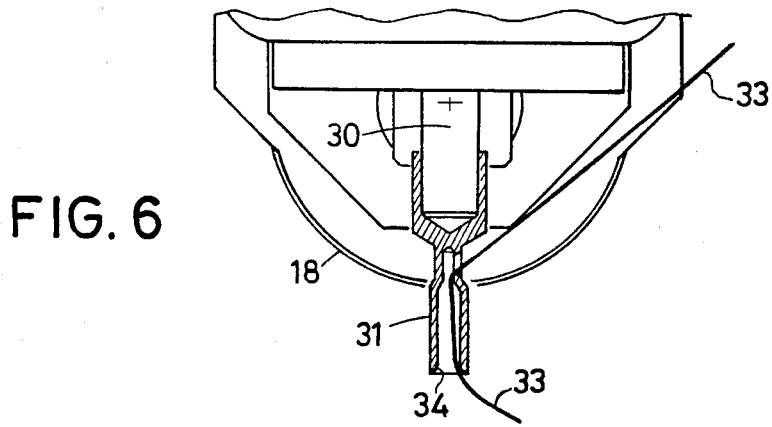

With reference more particularly to FIGS. 5 and 6, the lower end 13 of the arm 12 comprises a foot 17 fixed in the extension of the arm and on which is fixed a small electric motor 18, for example a step-by-step motor, whose horizontal shaft 19 extends through the foot 17.

Figure 4:
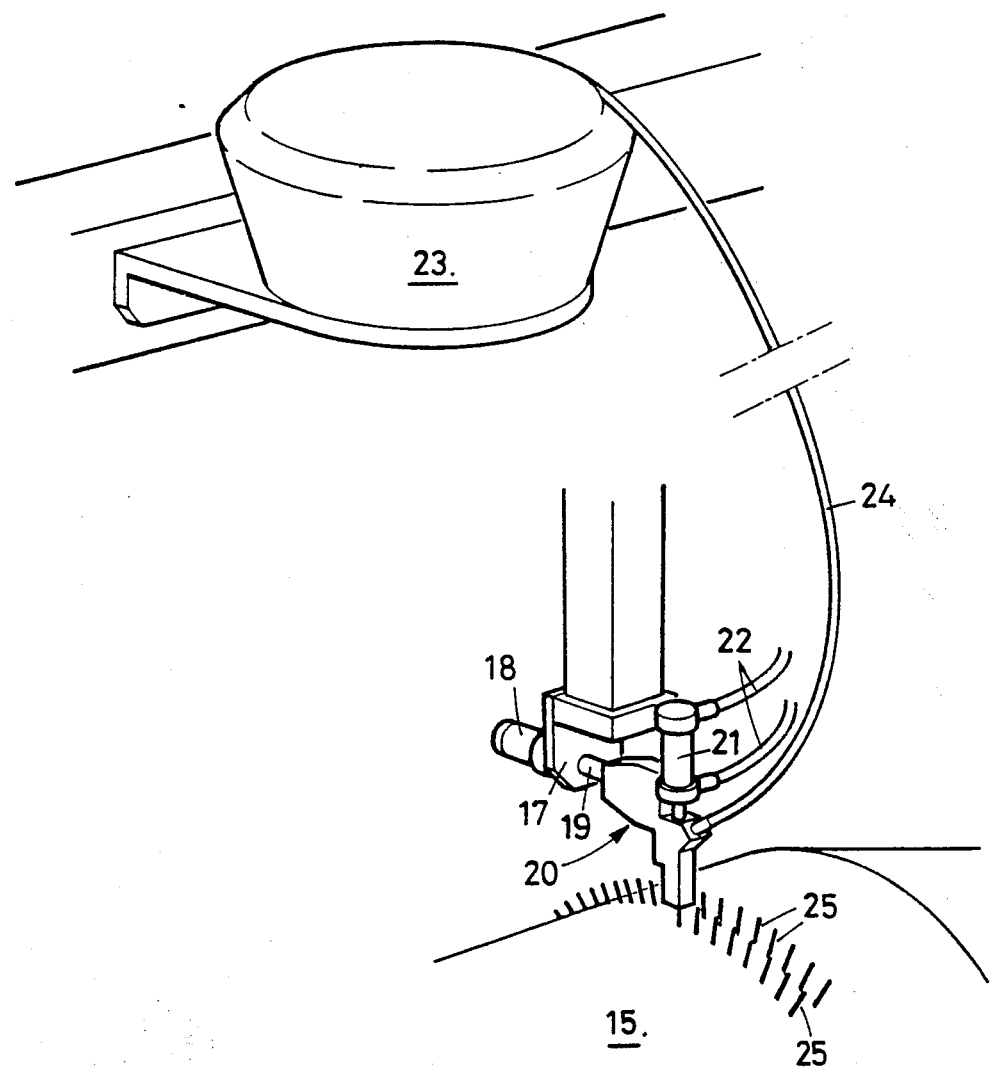
FIG. 4 is a partial perspective view of a first detachable work device adapted to implant pins in the mandrel and mounted on the lower end of the vertical arm.

FIG. 4 shows a first work device designated by the reference numeral 20 which may be detachably mounted on the shaft 19 of the motor 18.

This device 20 is a pneumatic nailing device of known type comprising a double-acting jack 21 connected through pipes 22 to a source of compressed air and to a control (not shown) and a vibratory reservoir-box 23 containing pins and connected to the device 20 through a pipe 24.

The reservoir 23 may be mounted on the frame of the machine or on another suitable support (not shown).

Mounting the device 20 on the shaft of the motor 18 enables this device to be oriented at any angle in a vertical plane and enables pins 25 to be driven in at all the desired points on the surface of the mandrel 15.

FIGS. 5 and 6 show a second work device which may be detachably mounted on the shaft 19 of the motor 18.

This second work device, designated by the reference numeral 26, is adapted to lay a thread on the surface of the mandrel 15 between the pins 25 or around the latter.

For this purpose, the device 26 comprises a support 27 adapted to be locked on the shaft 19 by a locking screw 28.

This support 27 carries a small step-by-step electric motor 29 whose shaft 30 extends vertically downwardly and carries a thread guide formed by a tube 31 of flattened sectional shape, open at the lower end and defining an opening 32 in its upper part, a thread 33 to be laid on the mandrel entering the thread guide tube 31 through the opening 32 and issuing therefrom at the lower end.

This lower end of the tube 31 is internally rounded as shown at 34 to avoid any risk of damage to the thread in the case of a fragile thread, and breakage of the latter when it issues from the thread guide tube 31 at a pronounced angle to the latter.

The thread 33 comes from a reserve 35 of reels mounted on the frame or other suitable support.

Figure 7:
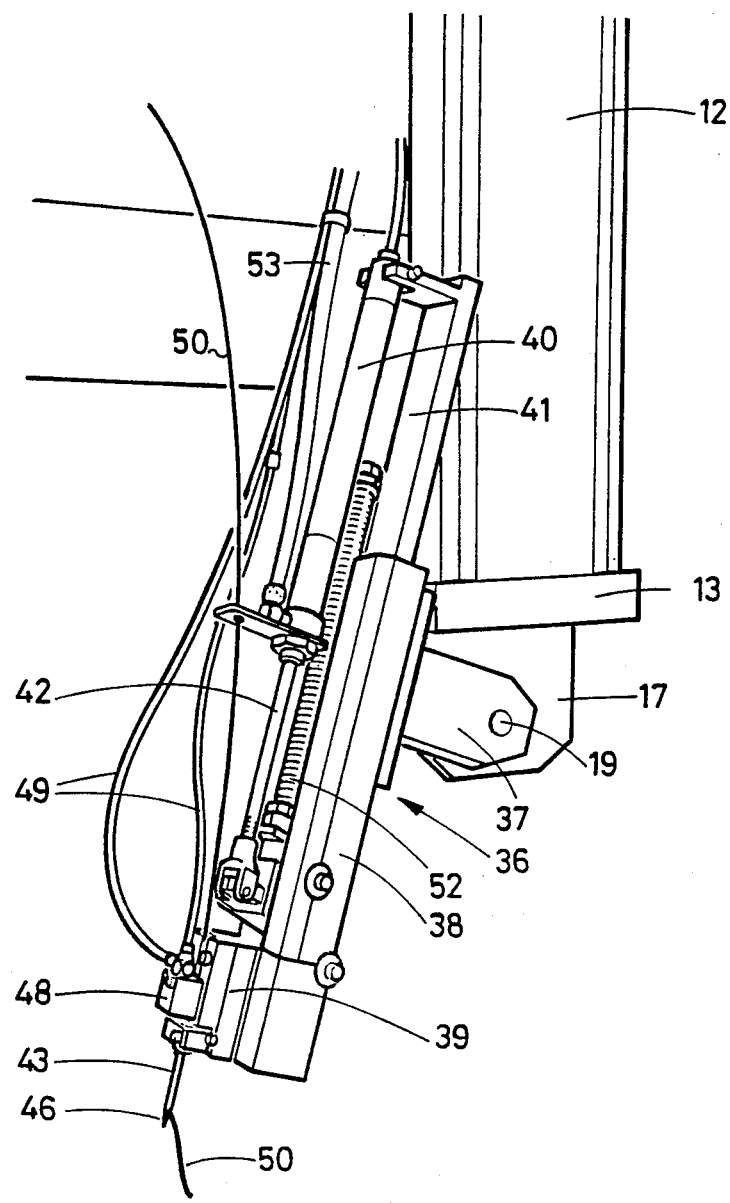
FIG. 7 is a view to an enlarged scale of the needle work device adapted to introduce continuous thread loops through the layers disposed on the mandrel.

FIG. 7 shows a third work device adapted to introduce loops of a continuous thread through layers previously laid on the surface of the mandrel 15.

This device, designated by the reference numeral 36, may also be detachably mounted on the shaft 19 of the motor 18. It comprises a support 37 fixed to the shaft 19 on which a rail 38 is fixed, a block 39 being slidable in the rail 38, and a pneumatic jack 40 has its cylinder fixed on an extension 41 of the rail 38, which extension is rigid with the rail, while the piston rod 42 of the jack is connected to the block 39.

The block 39 carries a needle 43 which is shown in section to an enlarged scale in FIG. 8 and will be described in more detail hereinafter.

The end 47 of the needle remote from its point 46 is fixed to one side of a pneumatic thread-clamp 48 of known type mounted on the block 39.

The thread-clamp 48 is connected through pipes 49 to a source of compressed air (not shown) and a thread of fibers 50 coming from a source (not shown) extends through the thread-clamp 48 and the passage 44 of the needle 43 and issues from the latter through the eye 45.

A return spring 52 is advantageously provided between the block 39 and the rail 38 so that, when the jack 40, fed with fluid through a pipe 53, has urged the block 39 forwardly in extension and is then connected to exhaust, the spring 52 returns the block 39 and the needle rearwardly.

It will be observed that the device 36, as the device 20, may be oriented in a vertical plane by the motor 18.

According to the process of the invention, the first work device 20 is employed in a first stage, this device being mounted on the end of the arm 12 of the machine, for implanting the pins 25 in the mandrel 15 composed of foam material at points of the surface of the mandrel chosen as a function of its shape, for retaining and maintaining a thread 33 against the surface of the mandrel between these pins and thus form an even layer.

Figure 2:
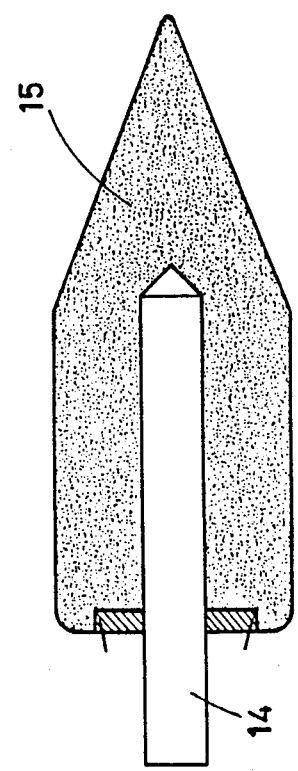
FIG. 2 is a longitudinal sectional view of the end of the mandrel-carrying shaft and a mandrel composed of a foam material disposed on this shaft.
Figure 3:
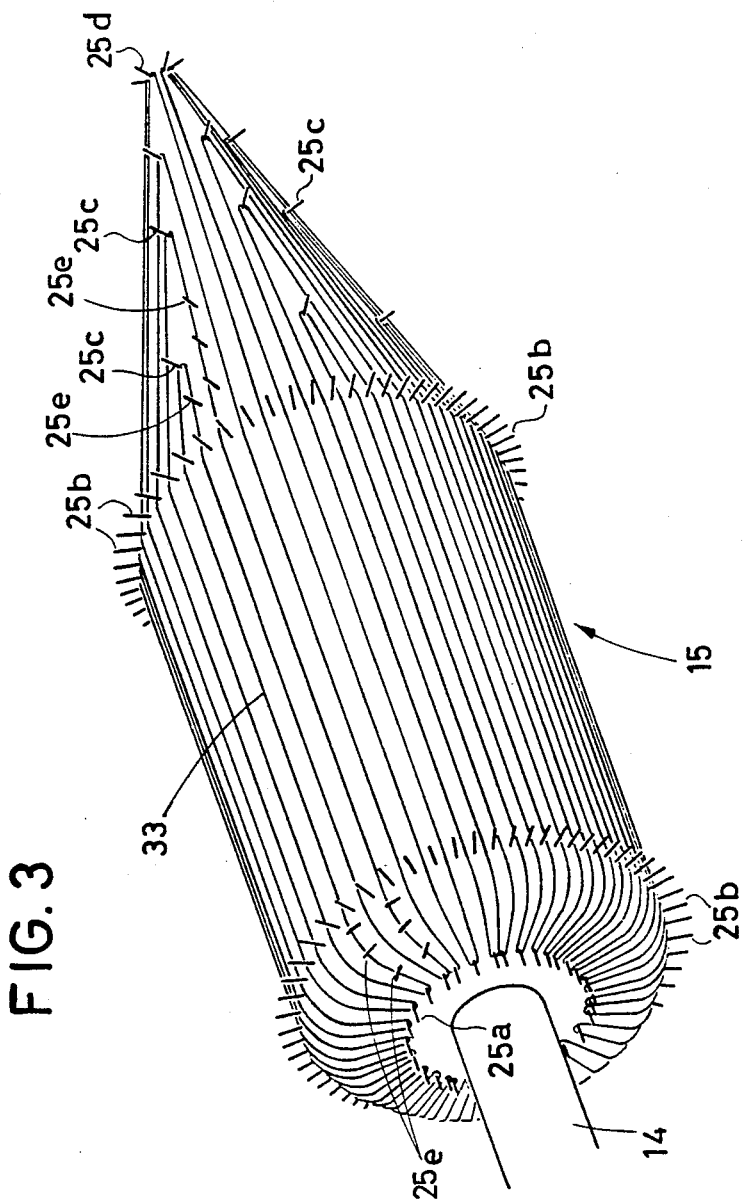
FIG. 3 is a perspective view of an embodiment of a reinforcement element in process of being manufactured, showing the arrangement of the pins implanted in the mandrel and the arrangement of the thread on these pins.

In the embodiment represented in FIG. 2, the mandrel has a cylindro-conical shape corresponding to the inner shape of the reinforcement element to be produced.

There is implanted, for example, a first series of pins 25a around the shaft 14, on the roughly flat part of the mandrel. There are then implanted, for example, two circumferential rows of pins 25b at the ends of the cylindrical body of the mandrel, then pins 25c spaced apart in staggered relation on the conical end part of the mandrel, pins 25d at the apex of this end part and finally pins 25e in circumferential rows in the parts of the surface of the mandrel which are inclined relative to its shaft 14.

Note that the pins 25b and all those implanted in the surfaces of the mandrel parallel or substantially parallel to its shaft are perpendicular to its surface, while the pins 25a, 25c, 25d and 25e, and generally all those implanted in surfaces which are inclined and perpendicular to this shaft will be advantageously inclined in the desired direction so that the thread tends to slide therealong and becomes lodged in an acute-angled corner formed by each of these pins with the associated surface of the mandrel.

In order to effect these implantations, the device 20 is shifted longitudinally along the surface of the mandrel 15 by inclining the device 20 in a suitable manner by actuating the motor 18 and by rotating the mandrel one step after each travel of the device 20 by means of the motor 16.

When pins have been implanted at all the chosen points, the device 20 is replaced by the device 26. A thread 33 is passed through the opening 32 in the thread guide 31, with the end of the thread issuing at the lower end of the thread guide.

This end is fixed, for example on one of the pins 25a, and the device 26 is shifted in the same way as in the preceding operation, by drawing the thread between the pins 25b to a point beyond one of the pins 25d at the apex of the cone.

The mandrel is then turned through one step and the thread 33 is brought back by passing it around the pin 25d, between two pins 25b, then, by inclining and lowering the device 26, by passing it around in the same way a second pin 25a adjacent to that of the start of the operation.

In order to avoid an accumulation of thread in the vicinity of the apex of the cone, intermediate pins 25c, spaced apart in staggered relation on the cone, are passed around.

When a first even layer of thread 33 has been in this way laid in the longitudinal direction, a second layer of thread is laid for example at 90° in the circumferential direction.

This winding may be carried out in a helical manner from, for example, one of the pins 25a by turning the mandrel and shifting the device 26 in a linear path.

The circumferential rows of suitably inclined pins 25e are adapted to receive a thread and to retain the thread in contact with the roughly planar end surface of the mandrel, and on its rounded part up to the start of the cylindrical part.

Likewise, the circumferential rows of pins 25e on the conical part are adapted to prevent the thread from sliding toward the apex.

Lastly, the pins 25b implanted in the parts of the surface parallel to the shaft of the mandrel are adapted to maintain an even spacing of the threads, and the thread guide 31 can be turned around its axis by the motor 29 for the purpose of presenting its narrowest section between the rows of pins.

The desired number of superimposed layers are in this way laid on the mandrel and it will be observed that if it is desired to reinforce any part of the element, it is sufficient, in the first stage, to implant pins at the boundaries of this part which will permit one or more additional passes of thread laying between these pins to be effected by passing therearound in one direction and then the other.

It must be stressed that, in the case of an evolutive surface having for example a concave part, there may be implanted, in the first stage, helical rows of pins against which the thread 33 is laid.

When this second stage of manufacture has terminated, the device 26 is replaced by the third work device 36.

The thread 50 is threaded through the thread-clamp 48 and passes along the needle 43 and, in a third stage, this thread is introduced through the crossed layers laid on the mandrel.

The thread 50 is introduced in the form of free loops by the needle 43 urged forwardly by the jack 40 and returned by the spring 52 in accordance with the sequence shown in FIGS. 10a to 10f, thereby effecting successive stitches.

Figure 10:
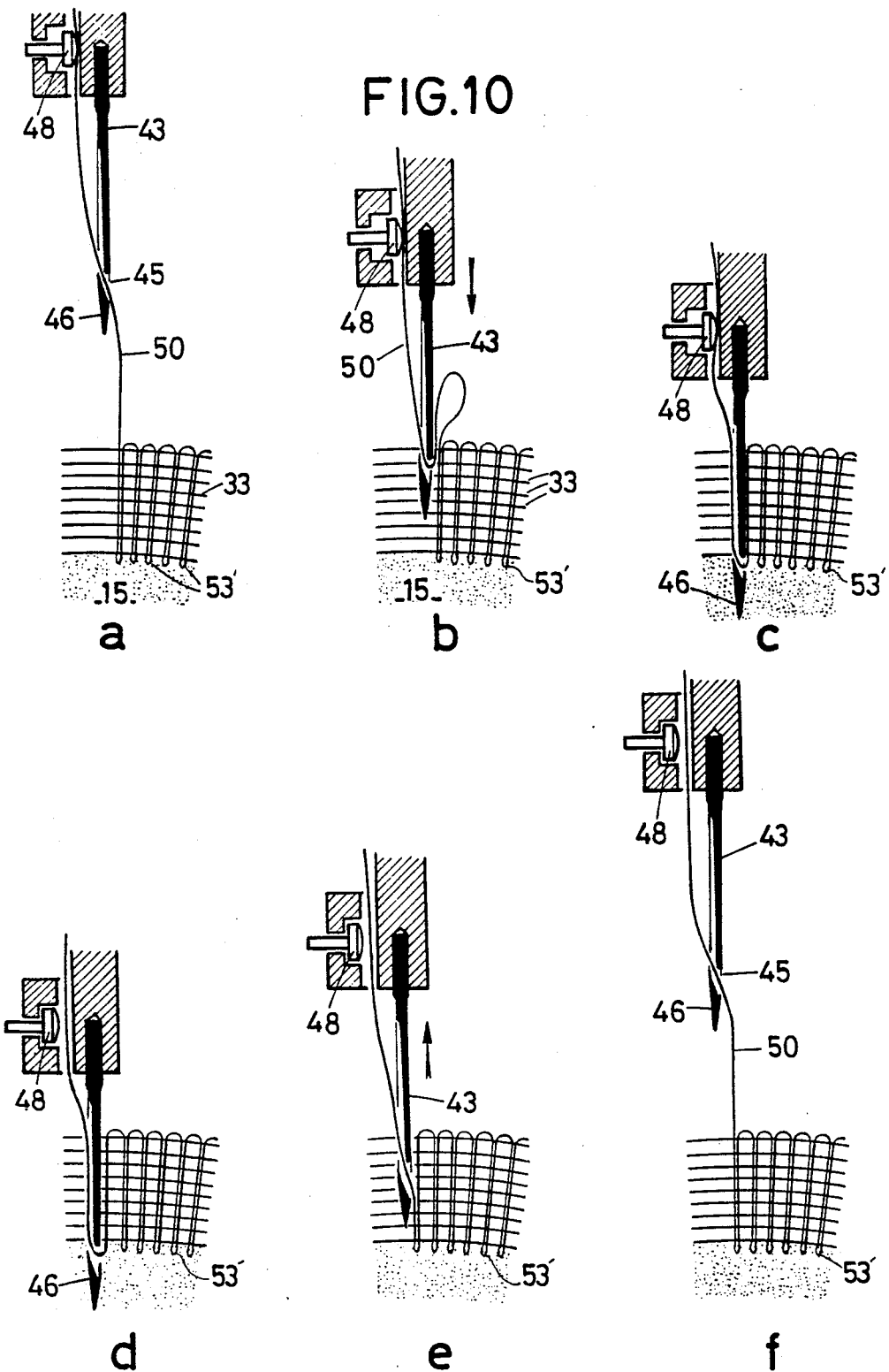
FIGS. 10a to 10f are diagrammatic sectional views of the different stages of the introduction of the loops of continuous thread through the layers laid on the surface of the mandrel.

The thread 50 is driven by the needle 43 through the layers, the thread-clamp being in the clamping position, and the travel of the needle being so adjusted as to penetrate the foam material of the mandrel to an extent a little beyond the eye 45 of the needle (FIGS. 10a, 10b, 10c).

The thread-clamp is then released (FIG. 10d) and the needle rises releases the thread progressively (FIG. 10e) through the layers and thus forms a small unclosed loop 53' 53 which is solely retained by the foam and the friction in the layers, down to below the interface between the foam and the first layer.

It will be understood that the elastic pressure of the foam material closing onto the loop after the withdrawal of the needle, on one hand, and the friction and gripping action of the threads of the superimposed layers, on the other hand, when the needle is withdrawn, are sufficient to retain the thread 50 which freely travels through the passage of the needle during this withdrawal.

After having travelled out of the layers of thread, the needle is made to rise above the surface of the layers a distance equal to the total thickness of the superimposed layers on the mandrel plus the stitch pitch, i.e. the desired spacing between two stitches (FIG. 10f).

The thread-clamp is then actuated for blocking the thread in the needle, the arm 12 is shifted one step, and the device is again brought into action for recommencing the cycle and thus continuously forms a large number of loops 53 with the same thread 50.

The pins implanted in the mandrel may be withdrawn progressively as the work of the device 36 progresses so as to avoid hindering its progression.

The shape of the needle is of great importance for effecting this third stage. Indeed, the threads 50 employed are most often threads having fragile fibers which may tend to separate from one another.

Consequently, it has been observed that if a needle having a conventional throughway eye is used, the fibers of the thread come apart at the outlet of the eye on both sides of the latter which results in cramming and breakage of the thread.

Figure 8:
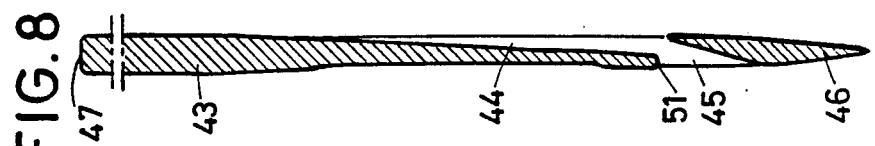
FIG. 8 is a longitudinal sectional view to an enlarged scale of the needle employed in the work device of FIG. 7.

For this reason, and as shown in FIG. 8, the needle 43 has an oblique throughway eye 45 whose edge remote from the point 46 has an inner rounded portion 51 around which the thread is bent upon penetration of the needle, thereby avoiding damage to the thread, or a splitting liable to cause its breakage.

The throughway eye 45 advantageously opens, at its end remote from the point 46, onto a longitudinal groove 44 of partly circular section whose depth gradually decreases in a direction away from the point and in which the thread travels.

Figure 9:
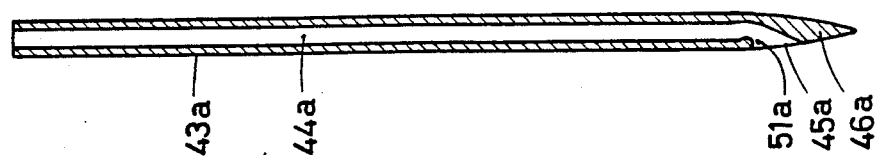
FIG. 9 is a longitudinal sectional view of a modification of the needle.

In the embodiment shown in FIG. 9, the needle 43a is hollow and defines an axial passage 44a which opens laterally and obliquely onto a non-throughway eye 45a whose edge remote from the point 46a has an inner rounded portion 51a similar to the rounded portion 51 of the needle 43, and the thread travels through the interior of the needle.

It will be understood that, with the machine according to the invention, the operation of the device 36 may be very rapid with a very regular or even pitch on all the parts of the surface of the mandrel by orienting the whole of the device 36 in a suitable manner for each of the parts of this surface.

Thus, in the end region remote from the apex of the conical part of the mandrel, the inclination of the device 36 will be gradually increased so that the needle passes through the layers always perpendicularly to the latter.

It will also be understood that the motors M1, M2, M3, 18, 29 and 16 are suitably controlled for effecting all these operations by means of an electronic device which includes a memory and is previously suitably programmed in accordance with the shape of the element to be produced, this device being of known type and not being part of the invention.

When the operation for introducing threads through the layers has terminated, the assembly is impregnated, either by leaving the reinforcement element on the mandrel or by previously withdrawing the latter in accordance with the conventional method.

In this respect, the essential feature of the element produced in accordance with the invention should be stressed, namely the fact that the superimposed and crossed layers of threads are maintained assembled, before impregnation, merely by the conjugate actions of the gripping and the friction of the threads of the superimposed layers on the continuous thread which passes therethrough in forming successive open loops interconnected on the outer surface of the element.

The applicant has found that these gripping and friction effects are alone sufficient to permit a reinforcement element produced in this way according to the invention to be handled and to retain its shape after the withdrawal of the mandrel and before its impregnation. It will be understood that such a result can only be obtained with at least three crossed superimposed layers.

For withdrawing the mandrel, the simplest procedure is to destroy it, for example by combustion.

Figure 11:
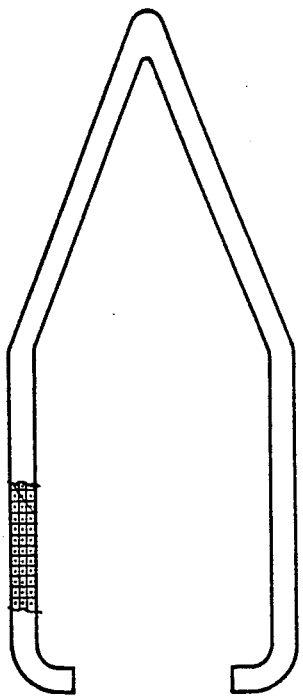
FIG. 11 is a longitudinal sectional view of the finished reinforcement element.

FIG. 11 shows the shape of the finished element and reveals the arrangement of the threads in three dimensions.

The use of temporary pins according to the invention requires the implantation of only a few hundred thereof for laying the layers on a given element, whereas the use of picots of the prior art requires the implantation of several tens of thousands thereof as definitive threads on the same element.

Consequently, the larger space left free between the pins permits the laying of denser layers of threads, these threads being moreover still further tightened by the introduction of the threads by means of the needle.

An element results whose properties of resistance are greatly superior to those of the elements of the prior art.

We claim:

1. A machine for manufacturing composite reinforcement elements woven in three dimensions from textile, mineral, synthetic or other fibers comprising: a frame; mounting means for mounting a disposable mandrel of foam or the like having externally the internal shape of the reinforcement element to be produced; rotation means for rotating said mounting means; a vertical arm carried by said frame above said mounting means and adjustable along three orthogonal axes; fixing means attached to said arm for detachably mounting work devices said fixing means including a foot member extending in the direction of said vertical arm, a motor fixed on said foot and a horizontal shaft supported by said foot and driven in rotation by said motor; implanting means for implanting rigid members in the mandrel, said implanting means being attachable to said fixing means; application means for applying on the surface of the mandrel successive layers of threads or fibers, the layers being superimposed and crossed in at least two directions; and interconnection means for interconnecting said layers by means of threads or fibers which extend perpendicularly through the layers.

2. A machine for manufacturing composite reinforcement elements woven in three dimensions from textile, mineral, synthetic or other fibers comprising: a frame; mounting means for mounting a disposable mandrel of foam or the like having externally the internal shape of the reinforcement element to be produced; rotation means for rotating said mounting means; a vertical arm carried by said frame above said mounting means and adjustable along three orthogonal axes; fixing means attached to said arm for detachably mounting work devices said fixing means including a foot member extending in the direction of said vertical arm, a motor fixed on said foot and a horizontal shaft supported by said foot and driven in rotation by said motor; implanting means for implanting rigid members in the mandrel, said implanting means being attachable to said fixing means; application means for applying on the surface of the mandrel successive layers of threads or fibers, the layers being superimposed and crossed in at least two directions; and interconnection means for interconnecting said layers by means of threads or fibers which extend perpendicularly through the layers, said interconnection means having a needle for driving a continuous thread forming consecutive loops through the crossed layers of thread laid on the mandrel.

3. A machine according to claim 2, wherein the interconnection means having a needle for driving a continuous thread comprises a support, a jack having a piston rod and carried by the support, a block slideably mounted on the support and connected to the piston rod of the jack, a spring biasing the block a needle and a thread-clamp mounted on said block, and a motor drivingly connected to the thread driving device for orienting it in a vertical plane.

4. A machine according to claim 3, wherein said needle includes a point at an end thereof and a throughway eye having an edge defining an inner rounded portion on a side of the eye remote from the point of the needle, and a longitudinal groove which opens laterally and obliquely onto the eye, said groove having a partly circular section having a depth which decreases in a directing away from said point.

5. A machine according to claim 4, wherein said needle is hollow and comprises a non-throughway eye defining an inner rounded edge portion and an axial passage opening laterally and obliquely onto the eye.

* * * * *

UNITED STATES PATENT AND TRADEMARK OFFICE
CERTIFICATE OF CORRECTION

PATENT NO. : 4,917,756

DATED : April 17, 1990

INVENTOR(S) : Cahuzac

It is certified that error appears in the above identified patent and that said Letters Patent is hereby corrected as shown below:

On the title page:

The filing date should be changed from:

March 23, 1987
  to
March 23, 1988

The following foreign foreign application priority data should be added:

March 25, 1987 [SR]   France............87-04126

Signed and Sealed this

Seventeenth Day of December, 1991

Attest:

HARRY F. MANBECK, JR.

*Attesting Officer*  *Commissioner of Patents and Trademarks*